US011780013B2

(12) United States Patent
Rajan et al.

(10) Patent No.: US 11,780,013 B2
(45) Date of Patent: Oct. 10, 2023

(54) PROPERTY TAILORED ADDITIVELY MANUFACTURED COMPOSITE STRUCTURAL ELEMENTS USING CONGRUENTLY MELTED TITANIUM-NIOBIUM-ZIRCONIUM ALLOY MATRIX

(71) Applicant: RAYTHEON COMPANY, Waltham, MA (US)

(72) Inventors: Sunder S. Rajan, Anaheim, CA (US); Keith Carrigan, Marina Del Rey, CA (US); Kurt S. Ketola, Los Angeles, CA (US)

(73) Assignee: RAYTHEON COMPANY, Waltham, MA (US)

(*) Notice: Subject to any disclaimer, the term of this patent is extended or adjusted under 35 U.S.C. 154(b) by 347 days.

(21) Appl. No.: 16/943,004

(22) Filed: Jul. 30, 2020

(65) Prior Publication Data
US 2022/0032366 A1 Feb. 3, 2022

(51) Int. Cl.
*C22C 14/00* (2006.01)
*B22F 10/00* (2021.01)
*B22F 1/054* (2022.01)
*B22F 3/10* (2006.01)
*B33Y 10/00* (2015.01)
(Continued)

(52) U.S. Cl.
CPC ............ *B22F 10/00* (2021.01); *B22F 1/0547* (2022.01); *B22F 3/1007* (2013.01); *C22C 14/00* (2013.01); *B22F 10/10* (2021.01); *B22F 2301/10* (2013.01); *B22F 2301/205* (2013.01); *B22F 2301/35* (2013.01); *B22F 2302/35* (2013.01);
(Continued)

(58) Field of Classification Search
None
See application file for complete search history.

(56) References Cited

U.S. PATENT DOCUMENTS 5,674,280 A 10/1997 Davidson et al.
5,801,891 A 9/1998 Lloyd
(Continued)

FOREIGN PATENT DOCUMENTS

CN 109136600 A * 1/2019
EP 0601804 A1 6/1994
(Continued)

OTHER PUBLICATIONS

Rao et al., "Replication and bioactivation of Ti-based alloy scaffold macroscopically identical to cancellous bone from polymeric template with TiNbZr powders", Aug. 23, 2018, J. of the Mechanical Behavior of Biomedical Materials, vol. 88, pp. 296-304. (Year: 2018).*

(Continued)

*Primary Examiner* — Xiaobei Wang
(74) *Attorney, Agent, or Firm* — CANTOR COLBURN LLP

(57) ABSTRACT

An optical mount part having a body that includes a composite of a titanium-zirconium-niobium alloy. The titanium-niobium-zirconium alloy includes titanium, about 13.5 to about 14.5 wt. % zirconium, and about 18 to about 19 weight % (wt. %) niobium. The titanium-niobium-zirconium alloy has a congruent melting temperature of about 1750 to about 1800° Celsius (° C.).

4 Claims, 5 Drawing Sheets

(51) Int. Cl.
  *B33Y 70/00* (2020.01)
  *B33Y 80/00* (2015.01)
  *B22F 10/10* (2021.01)
(52) U.S. Cl.
  CPC .............. *B33Y 10/00* (2014.12); *B33Y 70/00* (2014.12); *B33Y 80/00* (2014.12); *Y10T 428/12806* (2015.01)

(56) References Cited

U.S. PATENT DOCUMENTS

| | | | |
|---|---|---|---|
| 2013/0180627 A1* | 7/2013 | Miura | C23C 8/10 148/284 |
| 2014/0061420 A1 | 3/2014 | Kaufman et al. | |
| 2017/0275742 A1 | 9/2017 | Ganor | |
| 2018/0004070 A1 | 1/2018 | Po et al. | |
| 2019/0105876 A1 | 4/2019 | Al-Aqeeli et al. | |
| 2019/0111482 A1* | 4/2019 | Djemai | B22F 1/052 |
| 2020/0248285 A1 | 8/2020 | Rajan et al. | |

FOREIGN PATENT DOCUMENTS

| | | |
|---|---|---|
| EP | 1890183 A1 | 2/2008 |
| EP | 3112055 A1 | 1/2017 |
| EP | 3252278 A1 | 12/2017 |
| FR | 3047489 A1 | 8/2017 |
| WO | 2011139384 A1 | 11/2011 |
| WO | 2013112217 A2 | 8/2013 |
| WO | 2015038233 A1 | 3/2015 |
| WO | 2017137671 A1 | 8/2017 |
| WO | 2018126191 A1 | 7/2018 |
| WO | 2020160117 A1 | 8/2020 |

OTHER PUBLICATIONS

Notification of Transmittal of the International Search Report and the Written Opinion of the International Searching Authority, or the Declaration dated Jun. 23, 2021, 20 pages.
Notification of Transmittal of the International Search Report and the Written Opinion of the International Searching Authority, or the Declaration dated Jul. 6, 2021, 16 pages.
ASTM International, F1713-08, "Standard Specification for Wrought Titanium-13Niobium-13Zirconium Alloy for Surgical Implant Applications (UNS R58130)1", Reapproved 2013, 5 pps.
Bhuiyan et al., "Boron nitride nanotube reinforced titanium metal matrix composites with excellent high-temperature performance" Cambridge Core, vol. 32, Issue 19, 2017, pp. 3744-3752 (Abstract Only).
Bhuiyan et al., "Interfacial reactions between titanium and boron nitride nanotubes", ScienceDirect, Scripta Materialia, vol. 127, Jan. 15, 2017, pp. 108-112 (Abstract Only).
Bobbio et al., "Additive manufacturing of a functionally graded material from Ti-6AI-4V to Invar: Experimental characterization and thermodynamic calculations", Acta Materialia 127 (2017) 133-142.
Chen et al., "Additive manufacturing of metal functionally graded materials: A Review", Proceedings of the 29th Annual Solid Freedom Fabrication Symposium 2018.
Chen et al., "Optimization of lightweight structure and supporting bipod flexure for a space mirror", Applied Optics, vol. 55, No. 36, Dec. 20, 2016.
Chen et al., "Processing and properties of magnesium containing a dense uniform dispersion of nanoparticles" Nature 528, 539-543 (2015) (Abstract Only).
Chin, "Optical Mirror-Mount Design and Philosophy", Applied Optics, Jul. 1964, vol. 3, No. 7, pp. 895-901.
Chow et al., "Evaluation of Cardiovascular Stents as Antennas for Implantable Wireless Applications", IEEE Transactions on Microwave Theory and Techniques, Plenum, USA, vol. 57, No. 10, Oct. 1, 2009, pp. 2523-2532, XP011276668.
Chu et al., "Design of Bipod flexures for space mirror", Proceedings of SPIE, vol. 8196, 819620-1 through 819620-11.
Ezekiel G. Merriam, "Design of 3D-Printed Titanium Compliant Mechanisms," Proceedings of the 42nd Aerospace Mechanisms Symposium, NASA Goddard Space Flight Center, May 14-16, 2014, 6 pps.
Gen-El-Mec Associates, Inc., "Gen-El-Mec Specializes in Precision & Custom CNC Milling, Turning & Wire EDM Services", Custom Manufacturing & Inspection of Titanium Flexures—Connecticut, © 2014, 2 pages.
Harrison et al., "Polyethylene/boron nitride composites for space radiation shielding", Journal of Applied Polymer Science, 2008, vol. 109 Issue 4 (Abstract Only).
Hiroaki Matsumoto, et al., "Beta TiNbSn Alloys with Low Young's Modulus and High Strength", Materials Transactions, vol. 46, No. 5 (2005) pp. 1070 to 1078.
ISR/WO, Issued Apr. 14, 2020, RAY0410PCT.
Jason J. Gorman, et al., "MEMS Nanopositioning Mechanisms: Design and Experimental Characterization", MEMS Alliance Symposium, Apr. 19, 2005, 16 pps.
Kihm et al., "Adjustable bipod flexures for mounting mirrors in a space telescope", Applied Optics vol. 51, No. 32, Nov. 10, 2012.
Michael Gasik, et al., "Phase equilibria and thermal behaviour of biomedical Ti—Nb—Zr alloy", ResearchGate, 17th Plansee Seminar Jan. 2009, vol. 1 8 pps.
MIT OpenCourseWare (Massachusetts Institute of Technology), http://ocw.mit.edu/terms, 2.72 Elements of Mechanica Design Lecture 08: Flexures, Spring 2009, 42 pps.
Qing Liu, "α' Type Ti—Nb—Zr alloys with ultra-low Young's modulus and high strength", Progress in Natural Science Materials International 2013; 23 (6) pp. 562-565.
Qingkun Meng, et al., "A βtype TiNbZr alloy with low modulus and high strength for biomedicalapplications", Progress in Natural Science:Materials International 24 (2014), pp. 157-162.
Reichardt, "Additive Manufacturing of Metal-based Functionally Graded Materials", UC Berkeley, PhD Thesis Nuclear Engineering 2017; pp. 1-108.
Robert Fata, et al., "Flexure mounts for high performance astronomical lenses", Proc. of SPIE vol. 6269, 62695T, (2006), 12 pps.
Schneider et al., "Study of the non-linear stress-strain behavior in Ti—Nb—Zr alloys", Materials Research, vol. 8, No. 4, pp. 435-438, XP009152292, Oct. 1, 2005.
Thibeault et al., "Radiation Shielding Materials Containing Hydrogen, Boron, and Nitrogen: Systematic Computational and Experimental Study—Phase I" NIAC Final Report, 2012.
Tian Tuo Machinery, "The first successful 3D printing of BNNT", https://frptitan.com/bnnt-titanium-composites/.
Todd M. Mower, et al., "Mechanical behavior of additive manufactured, powder-bed laser-fused materials", Materials Science & Engineering A 651 (2016) pp. 198-213.
Tomomichi Ozaki, et al., "Beta Ti Alloys with Low Young's Modulus", Materials Transactions, vol. 45, No. 8 (2004) pp. 2776 to 2779.
Vukobratovich D, et al., "Flexure Mounts for High Resolution Optical Elements", Proc. of SPIE vol. 0959, Optomechanical and Electro-Optical Design of Industrial Systems, ed. R J Bieringer, K G Harding (Jan. 1988) Copyright SPIE., 19 pps.
Wang et al., "Selective laser melting under the reactive atmosphere: A convenient and efficient approach to fabricate ultrahigh strength commerically pure titanium without sacrificing ductility", ScienceDirect, Materials Science and Engineering: A, vol. 762, Aug. 5, 2019, 138078 (Abstract Only).
Yan et al., "Additive manufacturing of functionally graded metallic materials using laser metal deposition", Elsevier, Additive Manufacturing 31 (2020) 100901.
Reichardt, "Additive Manufacturing of Metal-based Functionally Graded Materials", UC Berkeley, PhD Thesis Nuclear Engineering 2017; pp. 109-163.
Reichardt, "Additive Manufacturing of Metal-based Functionally Graded Materials", UC Berkeley, PhD Thesis Nuclear Engineering 2017; pp. 164-212.

(56) References Cited

OTHER PUBLICATIONS

Reichardt, "Additive Manufacturing of Metal-based Functionally Graded Materials", UC Berkeley, PhD Thesis Nuclear Engineering 2017; p. 213.

A Zettl, "Electroactive, Radiation-shielding Boron Nitride Polymer Composites", University of California at Berkeley, AFOSR Low Density Materials Program Review, Dayton, Ohio Jun. 4, 2012, (https://community.apan.org/wg/afosr/m/low_density_materials/113496/download), 16 pages.

PCT Notification of Transmittal of the International Preliminary Reporton Patentability of the International Application No. PCT/US2021/026373 dated Feb. 9, 2023, 14 pages.

PCT Notification of Transmittal of the International Preliminary Reporton Patentability of the International Application No. PCT/US2021/026376 dated Feb. 9, 2023, 11 pages.

\* cited by examiner

PROPERTY TAILORED ADDITIVELY MANUFACTURED COMPOSITE STRUCTURAL ELEMENTS USING CONGRUENTLY MELTED TITANIUM-NIOBIUM-ZIRCONIUM ALLOY MATRIX

BACKGROUND

The present disclosure relates to composite alloy materials, and more specifically, to additively manufactured composite structural elements from titanium alloys.

Due to their favorable properties, titanium (Ti) alloys are used in a variety of aerospace applications. For example, such materials are used in structural airframes and engine components. Titanium alloys are also used in high resolution optical instruments in space exploration, precise motion control mechanical systems, flexural parts of micro-positioners and optical mounts, all of which are often designed to maintain the position of an optical element throughout its assigned lifetime. Titanium alloys have also been successfully used in applications involving wire type antennae.

While titanium alloys are used in optical mount and assembly hardware, one consideration when such a material for a particular application is the material's thermal stability, which is a measurement of the sensitivity to changes in temperature that can be caused by the environment or even by the hardware to which the component is fastened. When materials have low thermal stability, the mounts can move, causing angular deflection away from the intended target. The coefficient of thermal expansion (CTE) is a measure of the thermal stability of a material, which describes the fractional change in size per degree change in temperature at a constant pressure. When choosing a mounting hardware, generally a material should be mounted to another material with a similar CTE, which will provide more thermal stability.

SUMMARY

According to one or more embodiments of the present disclosure, an optical mount part includes a body that includes a composite of a titanium-zirconium-niobium alloy. The titanium-niobium-zirconium alloy includes titanium, about 13.5 to about 14.5 wt. % zirconium, and about 18 to about 19 weight % (wt. %) niobium. The titanium-niobium-zirconium alloy has a congruent melting temperature of about 1750 to about 1800° Celsius (° C.).

According to other embodiments of the present disclosure, a powder mixture includes a composite blend of a titanium-zirconium-niobium alloy particles. The titanium-niobium-zirconium alloy particles include titanium, about 13.5 to about 14.5 wt. % zirconium, and about 18 to about 19 weight % (wt. %) niobium. The titanium-zirconium-niobium alloy has a congruent melting temperature of about 1750 to about 1800° C.

Yet, according to other embodiments of the present disclosure, a method of making a composite part includes depositing a blend of a first alloy powder and a second alloy powder onto a surface. The first alloy powder includes a congruently melting alloy of titanium, about 13.5 to about 14.5 wt. % zirconium, and about 18 to about 19 wt. % niobium. The congruently melting alloy has a congruently melting temperature of about 1750 to about 1800° C. The method also includes melting the blend to form a first layer comprising a composite. The method further includes repeating the depositing and the melting to form a plurality of successive layers to build up the composite part.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1A:
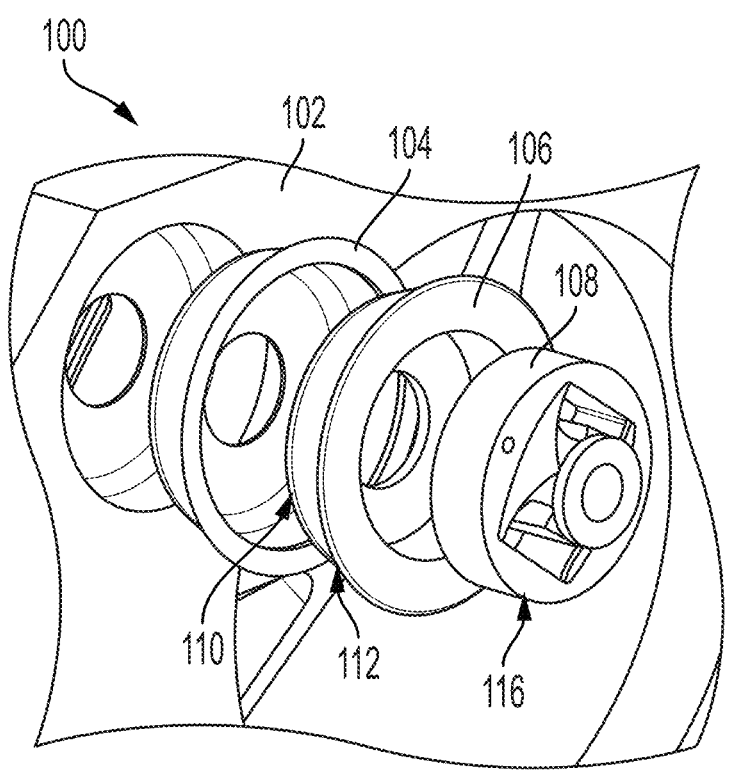
FIG. 1A depicts a perspective view of an optical assembly with an optical part made from a composite of a titanium-zirconium-niobium alloy according to embodiments of the present disclosure.

For the sake of brevity, conventional techniques related to metallurgical processing, melting, and casting may or may not be described in detail herein. Moreover, the various tasks and process steps described herein can be incorporated into a more comprehensive procedure or process having additional steps or functionality not described in detail herein. Various steps in the manufacture of metal alloys are known and so, in the interest of brevity, many conventional steps will only be mentioned briefly herein or will be omitted entirely without providing the known process details.

Titanium alloys play key roles in space and tactical design applications due to their favorable properties, such as high strength and ductility, in combination with reduced elastic modulus. However, challenges of using titanium alloys in flexures, optical mounts, other compliant structures, mechanisms, and assemblies are due to their lack of sufficient flexibility and excessive actuation effort needed due to energy storage in the deflection mechanism. In some cases, fabrication of advanced compliant mounts and mechanisms with titanium alloys is limited by conventional post-processing, which includes rolling, extrusion, and other processes associated with large plastic deformations, due to such processes potentially affecting the material microstructure.

Using titanium alloys in compliant mounts or mechanism structures such as flexures is also challenging because database information on the phase equilibria and thermochemistry of desired ternary titanium alloys, e.g., titanium-zirconium-niobium (Ti—Zr—Nb), is lacking. Such information is needed to model the alloy in various flexures, as well as its metallurgical processing, particularly, its solidification homogenization, transient phase, and congruent melting specifics. The data is also needed to predict intermetallic phase formation and stability during industrial processing for the particular flexure. Accordingly, accurate experimental and thermodynamic assessment of various titanium alloys is needed to determine which ones are best suited for flexure applications.

While use of composite materials for precise tailoring of CTE properties for optical mounts and assemblies is desired, composites of titanium alloys have not been used in such applications due to the lack of database information on phase equilibria and thermochemistry, as mentioned above. Further, titanium alloys have been largely incompatible with other alloys needed to achieve the required CTE match, such as invar and stainless steel. Invar, a nickel-iron alloy with 36% nickel and 64% iron, has a low CTE of about $0.3 \times 10^{-6}$ $(°C.)^{-1}$. Stainless steel alloys, which are a range of iron-based alloys, have CTEs of about 10.2 to $17.2 \times 10^{-6} (°C.)^{-1}$. When combined with invar or stainless steel, previously described titanium alloys have been shown to form brittle intermetallic phases and lead to cracking, which demonstrates the difficulty in forming composite alloy systems for the exacting requirements of optical systems.

Accordingly, one or more embodiments of the present disclosure address the above-described shortcomings by providing an additive manufactured composite with a lightweight titanium alloy matrix, which is suitable for forming optical mounts, parts, and other assembly hardware. The titanium alloy is a titanium-zirconium-niobium (Ti—Zr—Nb) alloy that includes about 13.5 to about 14.5 wt. % zirconium, about 18 to about 19 weight % (wt. %) niobium, and optionally other elements, and is congruently melting with high purity and uniform chemistry. The composites include the congruently melting titanium-zirconium-niobium alloy powder and other alloy powders, such an iron alloy, a nickel alloy, a nickel-iron alloy, an iron-carbon alloy, an aluminum alloy, a copper alloy, a cobalt alloy, or any combination thereof. The composites are used to form hardware and/or parts to assemble an optical piece, such as a mirror, with a mounting base by tailoring additive components of the assembly hardware to match the CTEs. In some aspects of the present disclosure, additive manufacturing methods, for example Direct Laser Deposition (DLD), are used to form a gradient tailored composite part.

Aspects of the present disclosure provide various advantages. When a gradient composite part is formed, the assembly provides a closer thermal expansion match between the optical element (e.g., mirror) and the mounting base. Further, by thermal expansion gradient matching the CTEs of the elements to be joined, the need for additional flexures is minimized or in instances eliminated. The composite powder alloy blends have superior ductility and high corrosion resistance, which provide enhanced fatigue performance due to reduction in crack propagation.

Composite Alloy Powder

The composite alloy powder includes a composite blend of a titanium-zirconium-niobium alloy powder and another metallic alloy powder. The titanium-zirconium-niobium alloy powder includes about 13.5 to about 14.5 wt. % zirconium, about 18 to about 19 weight % (wt. %) niobium, and optionally other elements, with the balance being titanium. According to some embodiments of the present disclosure, the titanium-zirconium-niobium alloy powder includes 60 to about 72 wt. % titanium. According to other embodiments of the present disclosure, the titanium-zirconium-niobium alloy powder includes 66.5 to about 68.5 wt. % titanium. Yet, according to other embodiments of the present disclosure, the titanium-zirconium-niobium alloy powder includes about or any range between about 60, 61, 62, 63, 64, 65, 66, 67, 68, 69, 70, 71, and 72 wt. % titanium.

According to one or more embodiments of the present disclosure, other elements are included in the titanium-zirconium-niobium alloy powder, which can be but are not limited to, iron (Fe), oxygen (O), carbon (C), nitrogen (N), hydrogen (H), or any combination thereof. However, the titanium-zirconium-niobium alloy powders can include other elements not mentioned in the foregoing elements, and the disclosure is not to be construed as being limited to these elements. The amounts of the other elements in the titanium-zirconium-niobium alloy powder are significantly less than the zirconium and niobium present, with the titanium making up a majority of the alloy. According to some embodiments of the present disclosure, the amount of each of the other elements is less than 1 wt. %, less than 0.5 wt. %, less than 0.2 wt. %, less than 0.1 wt. %, less than 0.05 wt. %, less than 0.02 wt. %, or less than 0.01 wt. %. Yet, the amounts of each of the other elements can vary substantially depending on the melting practices employed and the product being formed.

The titanium-niobium-zirconium alloy powder (also referred to a first alloy powder) is combined with another powder, which can be a metallic alloy powder (also referred to as a second alloy powder) or a dielectric to form a blend in the composite part. Non-limiting examples of metallic alloy powders include nickel-iron alloys (e.g., invar with 36% nickel), iron-based alloys (e.g., stainless steel), iron-carbon alloys (e.g., steel), aluminum alloys, copper alloys, nickel alloys, iron alloys, iron-nickel alloys, cobalt alloys, or any combination thereof. The titanium-niobium-zirconium powder is combined with a dielectric in some embodiments to form a radiofrequency (RF) Lossy composite part with controlled chemistry for use in microwave vacuum electronic devices to improve RF performance.

In some embodiments of the present disclosure, the titanium-niobium-zirconium alloy is blended in a composite blend with a conductive metal, such as copper or molybdenum. Such blends will allow tailoring of properties such as thermal conductivity, electromagnetic interference (EMI) and radio frequency interference (RFI) shielding, and/or radiation shielding. An advantage of having the titanium-niobium-zirconium as the matrix for blending is the congruently melting feature, which enables dealing with the melting point mismatch much better than alloy powders that have a two-phase melting region (liquid+solid). The alloys with such two-phase regions lead to very complex reactions and formation of multiple micro constituents that have adverse effects on performance properties and promote cracking tendency.

The powder particles of the titanium-zirconium-niobium alloy are homogenous and uniform in chemistry, regardless of the particle size. The titanium-zirconium-niobium alloy powder has particles that vary in size depending on the application. The titanium-zirconium-niobium alloy powders can be microparticles, nanoparticles, or a combination thereof. In some aspects of the present disclosure, the titanium-zirconium-niobium alloy powder has a particle size of about 2 to about 44 micrometers (microns). In other aspects of the present disclosure, the titanium-zirconium-niobium alloy powder has a particle size of about 44 to about 300 microns.

Like the titanium-zirconium-niobium alloy powder, the other (second) metallic alloy powder in the composite has a particle size that varies depending on the particular application of the composite. The metallic alloy powders can be microparticles, nanoparticles, or a combination thereof. In some aspects of the present disclosure, the second metallic alloy powder has a particle size of about 2 to about 44 microns. In other aspects of the present disclosure, the second metallic alloy powder has a particle size of about 45 to about 300 microns.

Using blends of microparticles or microparticles with nanoparticles to form a homogenous powder mixture provides advantages. First, such blends provide solution formation in the matrix and reduced susceptibility to form brittle phases due to reduced activity of the alloying elements. Second, such blends have higher compliance (low modulus) and high purity, further reducing the susceptibility to crack formation. When nanoparticles are used, they will range in particle sizes from a few nanometers to a few hundred nanometers. The particles will be attached and uniformly dispersed with microparticles of the titanium-niobium-zirconium alloy microparticles to provide a uniform dispersion. The nanoparticles may or may not be of a tubular cross section and may in fact be of spherical to spheroidal shape, sometimes referred to as "nano onions."

According to other embodiments of the present disclosure, a nanocomposite powder is included in the blends used to form the composite. The nanocomposite powder can include a boron-containing compound. For example, well-dispersed boron nanoparticles, boron nitride nano-particulates, and primarily boron nitride nanotubes (BNNTs) embedded into the above matrix of the congruently melted titanium-niobium-zirconium alloy provide effective radiation shielding. These shielding composites can be fabricated in various forms, such as rods, plates, thin shells, etc. The obtained structural elements can be further re-processed and integrated. The boron nitride, having a large neutron absorption cross-section can effectively shield against neutrons and can absorb harmful secondary neutrons generated by primary radiation. The incorporation of boron nitride nanoparticles into the titanium-niobium-zirconium matrix is based on solid state joining processes and 3D-printing. The developed composite family can be used in the aerospace applications.

The titanium-zirconium-niobium alloy is congruently melting, as the alloying metals, zirconium and niobium, are completely miscible. Further, the alloys are a single phase due to solid solution formation, without intermetallic or multiphases. With such properties in the matrix, the titanium-zirconium-niobium alloy presents minimal adverse reactions in the composite powder/material.

Prior to designing a metallurgical cycle to form the titanium-zirconium-niobium alloy, the phase diagram must be evaluated for an alloy, including the congruent melting zone. With a limited experimental data on properties of different constituents and phases, a spline approximation can be used, and 3D printing can define all metallurgical states using low-temperature polymers for modeling. The congruent melting is defined by a selected and separate color, such that the most applicable metallurgical process for congruent melting can be selected from that plastic model; it can have different approximations provided that all end within the congruent zone to reflect a single-phase formation. Dimensional parameters of the congruent zone can be limited in sizes so that the incremental variations in practically achieved formulations still lie within the congruent zone defined by the phase diagram. In the case of ternary and tetranary alloys, congruent melting can be achieved by the eutectic melting between two binary phases. Congruent melting zone determinations include construction of the ternary phase diagram by examination of the binary systems involved, i.e., a systematic study of Ti—Zr, Ti—Nb, and Nb—Zr systems. 3D printing technology is very helpful in the synthesis of the ternary system.

According to one or more embodiments of the present disclosure, the congruent melting temperature of the titanium-zirconium-niobium alloy is about 1950 to about 2000° C. According to other embodiments, the congruent melting temperature of the titanium-zirconium-niobium alloy is about 1850 to about 2000° C. Yet, according to other embodiments, the congruent melting temperature of the titanium-zirconium-niobium alloy is about or in any range between about 1850, 1860, 1870, 1890, 1900, 1910, 1920, 1930, 1940, 1950, 1960, 1970, 1980, 1990, and 2000° C. The congruent melting temperature is less than each of titanium, zirconium, and niobium.

To form the titanium-zirconium-niobium alloy powder, various methods of melting, casting, and metal working can be used. The alloy can be manufactured by combining, melting and casting the titanium, zirconium, niobium, and optionally other elements, using a variety of melting and metal working practices. The methods used to form the powder alloys can alter the final chemical composition of the alloys. Methods of melting, e.g., air melting and vacuum induction melting, and using alloy powders made from atomization using air or oxidizing media can increase the oxygen level to as much as 0.3%, for example.

To form the composite powder, the titanium-zirconium-niobium alloy powder is combined with the metallic powder in the desired proportions. In some embodiments of the present disclosure, the composite powder composition is a homogenous composite that used to form an optical part with a homogenous amount each of the titanium-zirconium-niobium alloy and other alloy. In some aspects of the present disclosure, the composite powder compositions include about 1 to about 99 wt. % of the titanium-zirconium-niobium alloy powder, and about 99 to about 1% of the metallic alloy powder.

The titanium-zirconium-niobium alloys have a variety of properties that make them desirable for use in compliant structures and mechanisms. The alloys have a low modulus of elasticity, which is measured according to standard tensile test method ASTM E8/E8M-13a. Strain deformation due to exerted tensile load is measured using a Class B2 rated extensometer. According to one or more embodiments of the present disclosure, the titanium-zirconium-niobium alloy has a modulus of elasticity is about 8 to about 15 Megapounds per square inch (Msi). According to other embodiments of the present disclosure, the titanium-zirconium-niobium alloys have a modulus of elasticity of about 10 to about 13 Msi. Yet, according to other embodiments of the present disclosure, the alloys have a modulus of elasticity of about or in any range between about 8, 9, 10, 11, 12, 13, 14, and 15 Msi. As the composition gradient of the composite part is intentionally varied, the modulus of elasticity will vary accordingly until it matches the value of the singular alloy at the extreme limit of the composition. For example, the modulus of the 100% invar will resemble the modulus of invar, while the end of the composite which has 100% titanium-niobium-zirconium alloy will have the modulus resembling that of the titanium-niobium-zirconium alloy. The low modulus values are maintained over a temperature range of about −40° C. to about +125° C. in some embodiments of the present disclosure. In other embodiments of the present disclosure, the modulus values are maintained over a temperature range of about or in any range between about −40, −30, −20, −10, 0, 10, 20, 30, 40, 50, 60, 70, 80, 90, 100, 110, 120, and +125° C.

The titanium-zirconium-niobium alloys also have high tensile strength and ductility, in combination with the low elastic modulus. Low temperature aging over time further enhances the strength and lowers the modulus of elasticity. Ultimate strength is measured according to procedures outlined in ASTM E8/E8M-13a and is the maximum stress the alloy can withstand. According to one or more embodiments of the present disclosure, the ultimate strength of the alloy is about 102 to about 150 Kilopounds per square inch (Ksi). In other aspects of the present disclosure, the ultimate strength of the alloy is about or in any range between about 102, 104, 106, 108, 110, 112, 114, 116, 118, 120, 122, 124, 126, 128, 130, 132, 134, 136, 138, 140, 142, 144, 146, 148, and 150 Ksi. Yield strength is measured according to procedures outlines in ASTM E8/E8M-13a and is the stress that will cause a permanent deformation of 0.2% of the original dimension of the alloy. According to one or more embodiments of the present disclosure, the yield strength of the alloy is about 60 to about 120 Ksi. According to other embodiments of the present disclosure, the yield strength of the alloy is about or in any range between about 60, 65, 70, 75, 80, 85, 90, 95, 100, 105, 110, 115, and 120 Ksi.

The titanium-zirconium-niobium alloys also have an expanded elongation at break, which is up to 30% according to one or more embodiments of the present disclosure. The high elongation break demonstrates the high ductility of the alloys. The elongation at break, also referred to as strain-to-failure, is measured in accordance with ASTM E8/E8M-13a, paragraph 7.11.3.3. The elongation break is determined by measuring a scribed distance of 1.0 inch within the gauge area prior to and after testing. The measurement is reported as an engineering strain, albeit high elongation at failure. The elongation break measures a ratio between increased length and initial length after breakage of the alloy at room temperature. Like the elastic modulus, aging over time enhances the ductility, as measured by the elongation break, which is highly desirable. According to some embodiments of the present disclosure, the elongation at break of the alloy is about 8 to about 30%. In other embodiments of the present disclosure, the elongation at break of the alloy is about or in any range between about 8, 9, 10, 11, 12, 13, 14, 15, 16, 17, 18, 19, 20, 21, 22, 23, 24, 25, 26, 27, 28, 29, and 30%.

The titanium-zirconium-niobium alloys also demonstrate non-linear stress-strain behavior, which is described by the Ramberg-Osgood equation. The stress-strain curve is generated in accordance with the procedures outlined in ASTM E8/E8M-13a by using an extensometer. The Ramberg-Osgood equation approximates the non-linear behavior of materials in which the stress-strain curves cannot be represented by a linear function. The Ramberg-Osgood general equation is $\sigma = \kappa \varepsilon^n$, where $\sigma$ is the true stress of the alloy, $\varepsilon$ is the true strain of the alloy, $\kappa$ is a material constant of the alloy, and n is the strain hardening index of the alloy. The degree of non-linearity in the stress-strain behavior is quantified by the parameter n.

The non-linearity in stress-strain behavior makes the alloys suitable for a variety of compliant structures, such as flexures and optical mount assembly parts, but is not limited to these structures. In addition to the small magnitude physical non-linearity of stress-strain behavior, flexible structural members used in different precise flexures, flexural parts of micro-positioners, optical mounts, and antennae exhibit large deformations and/or large strains. The strain-displacement relations in these flexures become non-linear, which is primarily due to the large operational displacements. Such geometric non-linearity therefore is primarily associated with the mechanical systems, for example, including thin-walled shells, plates, and bars that undergo large deformations or deflections. In these types of structures, large deformations can result in non-linear strain and curvature displacement relationships. Thus, the precise flexures, flexural parts of micro-positioners, optical mounts, and antennae fabricated from titanium-zirconium-niobium alloys demonstrate the general type of non-linearity, as well as geometric non-linearity with non-linear displacement-strain structural behavior and stress-strain material non-linearity. The described alloys are non-linear materials from the very beginning of the loading process, which is an essential type of mechanical behavior fully applicable to design of the micro-optic and opto-electronic assemblies.

Composite Structures

The composite powders are used to form composite optical structures, such as an optical hardware part(s). FIG. 1A depicts a perspective view of an optical mount assembly 100 with an optical part(s) made from a composite of a titanium-zirconium-niobium alloy. The optical assembly 100 includes a structure 102 that is coupled to a flexure 108. The structure 102 and flexure 108 are made of materials with different CTEs. In some embodiments of the present disclosure, the structure 102 is a mirror. The structure 102 is made from a first material with a first CTE, and the flexure 108 is made from a second, different material, with a second, different CTE.

Bonding material 104 and a transition mount part 106 are arranged between the structure 102 and the flexure 108. The transition mount part 106 is an additively manufactured composite part that couples the structure 102 to the flexure 108. The transition mount part 106 includes composition that gradually varies from a first end 110 to a second end 112. The gradient of materials includes the first CTE of the structure 102 on a first end 110, and the second CIE of the flexure 108 on the second end 112. The additively manufactured part is CTE tailored depending on the parts to be coupled.

Non-limiting examples of metals in optical assemblies, for the structure 102 example, that require CTE matching include silicon carbide, beryllium, aluminum, glass, or a combination thereof. Non-limiting examples of metals in optical assemblies, for the flexure 108 for example, include an iron alloy, a nickel alloy, a nickel-iron alloy, an iron-carbon alloy, an aluminum alloy, a copper alloy, a cobalt alloy, or any combination thereof.

In some embodiments of the present disclosure, the structure 102 is silicon carbide, and the flexure 108 is titanium. The transition mount part 106 is a composite with a gradient of invar powder and titanium-niobium-zirconium alloy powder at the first end 110 (about 40:60 atomic percent (at. %)

to about 60:40 at. %), and 100 at. % titanium-niobium-zirconium alloy powder at the second end 112.

In other embodiments of the present disclosure, the structure 102 is silicon carbide, and both the transition mount part 106 and the flexure 108 are composites of titanium-niobium-zirconium. Together, the transition mount part 106 and the flexure 108 include an increasing gradient of invar powder and titanium-niobium-zirconium alloy at the first end 110 (CTE matching the structure 102) of the transition mount part 106, and 100% titanium-niobium-zirconium at the distal end of the flexure 108 (CTE matching titanium).

Figure 1B:
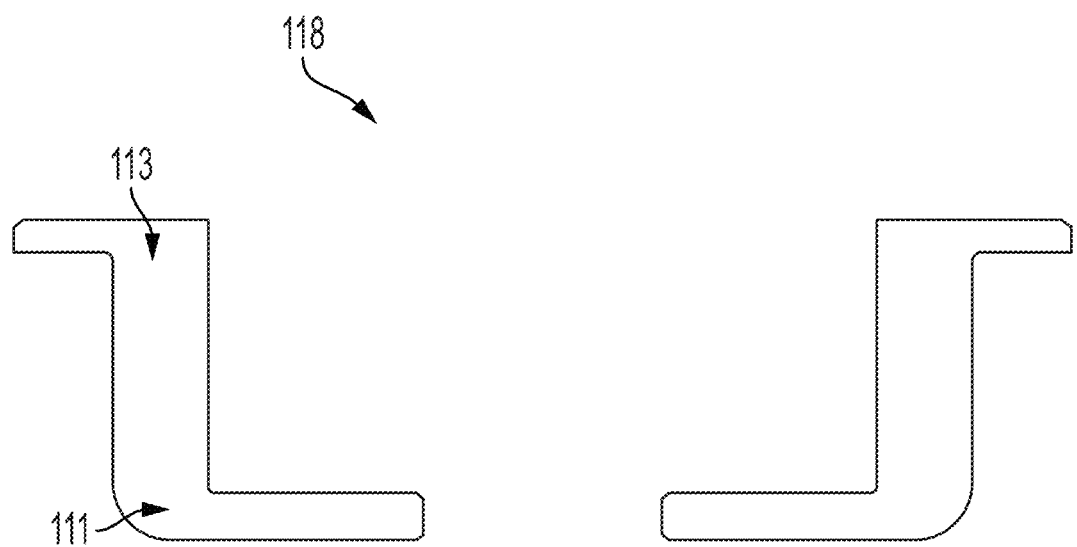
FIG. 1B depicts a perspective view of an optical part made from a composite of a titanium-zirconium-niobium alloy according to embodiments of the present disclosure.

FIG. 1B depicts a cross-sectional side view of an optical transition mount part 118 formed from a composite with an increasing gradient that CTE matches the structure 102 on the first end 111 and CTE matches titanium of the flexure 108 on the second end 113. The optical transition mount part is part of the assembly 100. The second end 113 (flanged end) is attached to the flexure 108, which includes titanium in some embodiments, and the first end 111 is attached to the structure 102, which is a silicon carbide mirror in some embodiments. Being CTE matched at first end 111 with the silicon carbide mirror allows for an increased range of temperature that the assembly could be exposed to without unduly stressing the bond or silicon carbide structure (structure 102).

The gradient of the transition mount parts 106, 118 varies depending on the CTEs to be matched. The gradient is a stepwise gradient or a gradual gradient. In some embodiments of the present disclosure, the first end 110 of the transition mount parts 106, 118 includes about 0 to about 100 at. % of the titanium-niobium-zirconium alloy, which increases in a gradient to the second end 112, which includes about 100 to about 0 at. % of the titanium-niobium-zirconium alloy.

The titanium-zirconium-niobium alloy has a low CTE, which is about 6.8 ppm per Kelvin (K) to about 7.7 ppm per Kelvin according to embodiments of the present disclosure. The CTE is measured by testing two specimens. Each specimen is bonded with a uniaxial strain gauge along the longitudinal axis. The same type of strain gauge is also bonded to a reference near-zero expansion material, such as titanium silicate glass. The specimens and the reference material are put into a thermal cycling chamber and subjected to two thermal cycles between −65° C. and +128° C. A personal computer-based data acquisition system is used to monitor and record strain and temperature from the specimens and reference. The coefficient of thermal expansion is determined from the slope of the resulting strain versus temperature chart.

Although the transition mount parts 106, 118 include a gradient of the titanium-zirconium-niobium alloy powder in some embodiments, in other embodiments the transition mount parts 106, 118 includes a homogenous composite mixture of the titanium-zirconium-niobium alloy, together with another alloy.

The titanium-niobium-zirconium alloy and the second alloy in the blend are tailored to provide any number of properties, including a thermal expansion gradient, a strength gradient, a thermal conductivity gradient, or a combination thereof in the composite part.

To form the transition mount parts 106, 118 with a gradient composite composition, additive manufacturing methods, such as direct laser deposition are used. Additive manufacturing builds three-dimensional (3D) objects by adding layer-upon-layer of material. In direct laser deposition, multiple powders, in this case the titanium-zirconium-niobium alloy powder and the second metal alloy powder, and optionally other components, are transported in separate compressed gas-powder jets towards the surface of a substrate, while a laser beam partially melts the substrate, which forms a liquid molten pool of the minimum depth. The transported powders are partially melted to form a bead on the substrate, and the solid product is formed by layering. The feed rates of the powders are varied to control the composition and form the gradient. The ultimate geometry is determined by the technological trajectory of the moving head relative to the product.

In some embodiments of the present disclosure, a reactive environment (a gaseous atmosphere, e.g., hydrogen or hydrocarbon gases mixes in an inert gas) is used during additive manufacturing to promote "in situ" formation of reaction product compounds with unique properties. Hydrides, for example, formed in such an environment have unique radiation shielding properties. By controlling the concentration and reaction time of the gases in the reactive environment, the part can be tailored to have a gradient or to have uniform shielding properties. Similarly, use of boron in the alloy blend and hydrocarbon gases in the atmosphere used for additive manufacturing lead to unique in situ formation of boron carbide in the composite, which provide properties of hardness and strength. Such gases can be tailored by varying the concentration of the gases and reaction times during additive manufacturing.

When gradient tailoring is not needed, a fused powder bed additive manufacturing process can be used to form a composite with a homogenous composition. The titanium-niobium-zirconium alloy matrix is blended to the required proportion with the second alloy phase material whether it be a ceramic or metallic material or a nanocomposite powder and obtain the uniform product. This method is very useful in producing radiation shielding enclosures which require uniform shielding properties over the entire structure of the composite part.

Figure 2B:
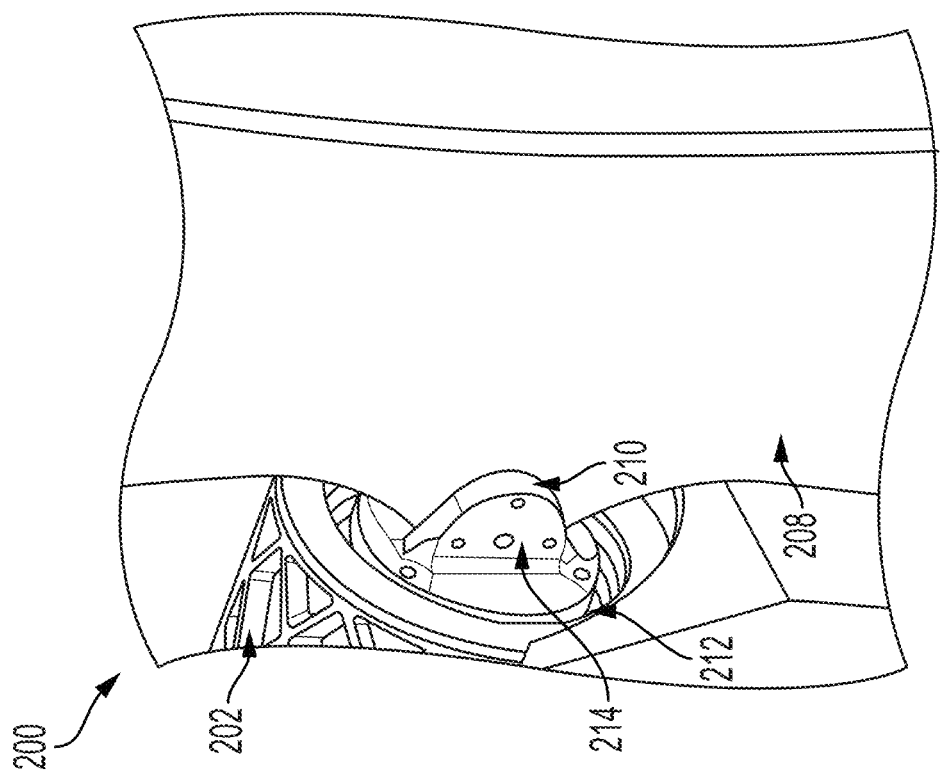
FIG. 2B depicts a perspective view of an optical assembly with an optical part made from a composite of a titanium-zirconium-niobium alloy according to embodiments of the present disclosure.
Figure 2A:
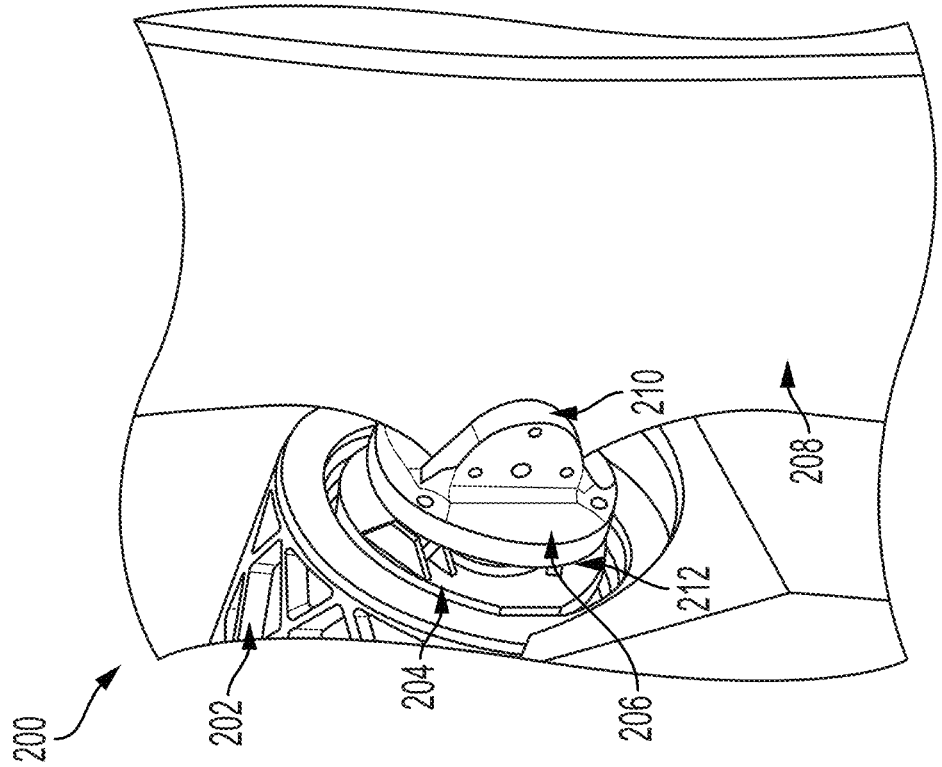
FIG. 2A depicts a perspective view of an optical assembly with an optical part made from a composite of a titanium-zirconium-niobium alloy according to embodiments of the present disclosure.

FIG. 2A depicts a perspective view of an optical mount assembly 200 with an optical part made from a composite of a titanium-zirconium-niobium alloy. The optical mount assembly 200 includes a spindle 202, a flexure 204, a clevis 206, and a mirror 208. The mirror 208 is coupled to the spindle 202 and flexure 204 via the clevis 206. The mirror 208 and flexure 204 are made of materials with different CTEs. The mirror 208 is made from a first material with a first CTE, and the flexure 204 is made from a second, different material, with a second, different CTE.

The clevis 206 is an additively manufactured composite part that couples the mirror 208 to the flexure 204 and/or the spindle 202. In some embodiments, the clevis 206 includes composition that gradually varies from a first end 210 to a second end 212. The gradient of materials includes the first CTE of the mirror 208 on a first end 210, and the second CTE of the flexure 208 on the second end 212. The additively manufactured part is CTE tailored depending on the parts to be coupled.

Non-limiting examples of metals in optical assemblies, for the mirror 208 example, that require CTE matching include silicon carbide, beryllium, aluminum, glass, or a combination thereof. Non-limiting examples of metals in optical assemblies, for the flexure 204 for example, include invar, titanium, titanium alloys, or a combination thereof. According to one or more embodiments of the present disclosure, the spindle 202 and the flexure 204 are made of titanium, and the mirror 208 is made of silicon carbide.

In some embodiments of the present disclosure, the mirror 208 is silicon carbide, and the flexure 204 is titanium. The clevis 206 is a composite with a gradient of invar powder and titanium-niobium-zirconium alloy powder at the first end 210 (about 40:60 atomic percent (at. %) to about 60:40 at. %), and 100 at. % titanium-niobium-zirconium alloy powder at the second end 212.

In other embodiments of the present disclosure, the mirror 208 is silicon carbide, and both the clevis 206 and the flexure 204 are composites of titanium-niobium-zirconium. Together, the clevis 206 and the flexure 204 include an increasing gradient of Invar powder and titanium-niobium-zirconium alloy at the first end 210 (CTE matching the mirror 102) of the clevis 206, and 100% titanium-niobium-zirconium at the distal end of the flexure 204 (CTE matching titanium).

Yet, in other embodiments of the present disclosure, the clevis 206 and the flexure 204 are combined into one additive composite part with an increasing gradient that CTE matches the mirror 208 on the first end 210 and CTE matches titanium of the spindle 202 on the distal end 116. FIG. 2B depicts a perspective view of an optical assembly 200 with a transition mount part 214 that eliminates the need for a separate flexure and is formed from a composite with an increasing gradient that CTE matches the mirror 208 on the first end 210 and CTE matches titanium of the spindle on the distal end 116.

The gradient of the clevis 206, flexure 204, and transition mount part 214 vary depending on the CTEs to be matched. The gradient is a stepwise gradient or a gradual gradient. In some embodiments of the present disclosure, the first end 210 of the clevis 206, flexure 204, and the transition mount part 214 each include about 0 to about 100 at. % of the titanium-niobium-zirconium alloy, which increases in a gradient to the second end 212 of the clevis 206, flexure 204, and transition mount part 214, which includes about 100 to about 0 at. % of the titanium-niobium-zirconium alloy.

Although the clevis 206, flexure 204, and transition mount part 214 include a gradient of the titanium-zirconium-niobium alloy powder in some embodiments, in other embodiments the clevis 206, flexure 204, and transition mount part 214 include a homogenous composite mixture of the titanium-zirconium-niobium alloy, together with another alloy.

The clevis 206, flexure 204, and transition mount part 106 with a gradient composite composition are made using additive manufacturing methods, such as direct laser deposition, as described above.

Figure 3:
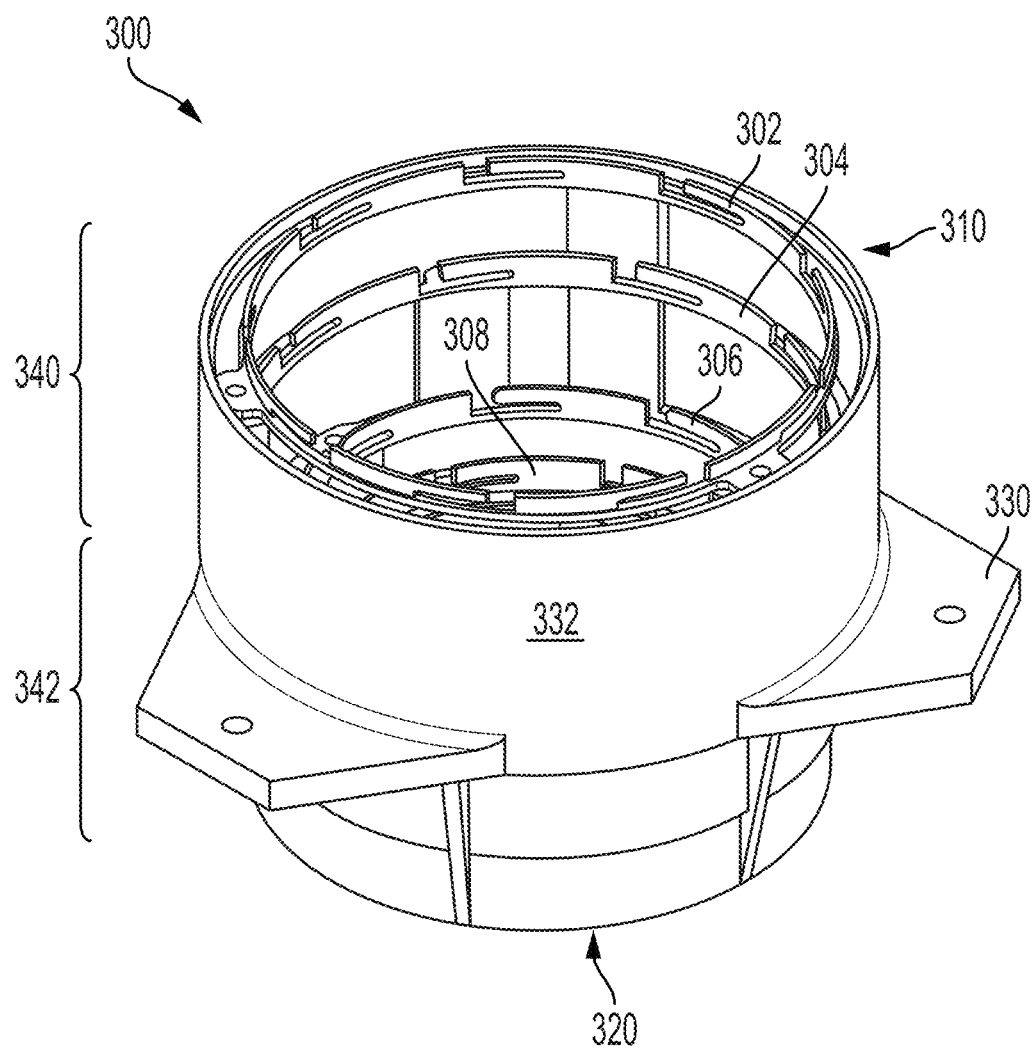
FIG. 3 depicts a perspective view of an optical part made from a composite of a titanium-zirconium-niobium alloy according to embodiments of the present disclosure.

FIG. 3 depicts a perspective view of an optical mount part 300 made from a composite of a titanium-zirconium-niobium alloy. The optical mount part 300 is used for mounting large optical elements, such as mirrors. The optical mount part 300 has cylindrical body 332, with one or more round or oblong flexures 302, 304, 306, 308 arranged inside the body 332, and one or more attachment arms 330 for coupling to another part of a mount assembly. The flexures 302, 304, 306, 308 are made from wrought forged titanium-niobium-zirconium alloy, as described herein, with a high compliance to minimize susceptibility to mirror cracking. The optical mount part 300 is sufficiently large to accommodate mirrors as large as 150 millimeters (mm) in diameter.

The optical mount part 300 is a composite that includes a gradient of titanium-niobium-zirconium alloy, which is formed by additive manufacturing, such as direct laser deposition. The gradient provides a CTE gradient, which increases from the first end 310 to the second end 320. At the first end 310, the composition is primarily a first metallic alloy, such as Invar, with a first low CTE. The composition gradually increases in CTE over the length of the body 332 to a second higher CTE that will be matched to another metal, such as aluminum. The CTE tailoring is achieved by adding the matrix powder in progressively higher proportions.

In some embodiments of the present disclosure, three metallic powders are used to form the composite with multiple gradient regions, for example two. One of the metallic powders is the titanium-niobium-zirconium alloy. Starting at the first end 310, a first gradient region 340 includes a mixture of a mostly a metallic alloy, such as invar, and the titanium-niobium-zirconium alloy, which increases moving towards the second gradient region 342. At the end of the first gradient region 340, approximately midway along the height of the body 332, the invar powder proportion is minimized, and a gradual increase in a third powder with a higher CTE will be added in increasing amounts to the blend in the second gradient region 342.

EXAMPLES

Titanium-zirconium-niobium alloy powder compositions were prepared, evaluated, and used to fabricate optical parts in accordance with embodiments of the present disclosure, as detailed in the Examples below.

Figures 4A, 4B:
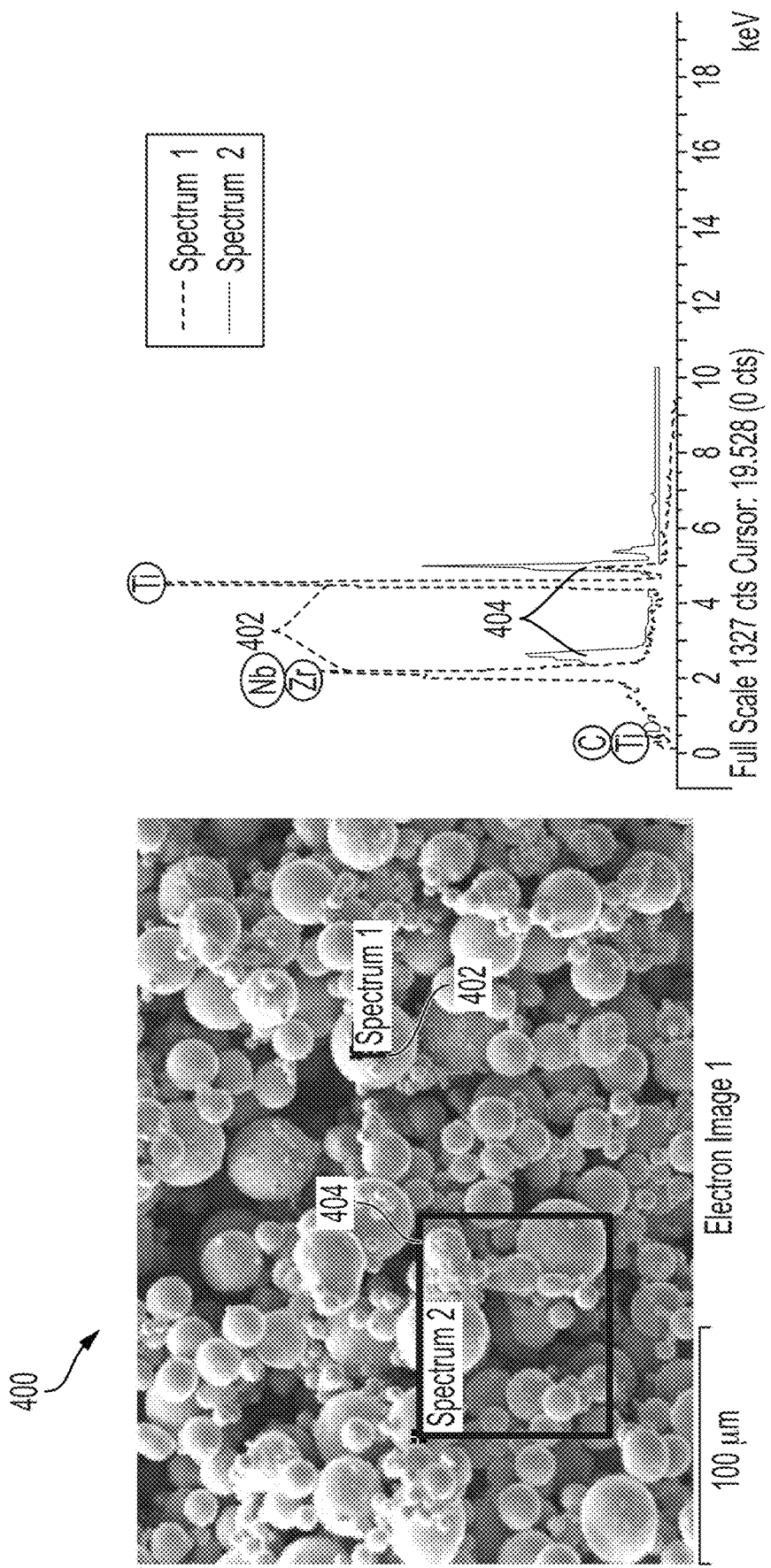
FIG. 4A depicts an electron micrograph of 325 mesh particles of titanium-zirconium-niobium alloy according to embodiments of the present disclosure.
FIG. 4B depicts an energy dispersive X-ray spectroscopy (EDX) graph of the 325 mesh particles of the titanium-zirconium-niobium alloy in FIG. 4A.

Particles of titanium-zirconium-niobium alloy were analyzed by scanning electron microscopy and energy dispersive X-ray spectroscopy (EDX). FIG. 4A depicts an electron micrograph image (400× magnification) of 325 mesh particles, and FIG. 4B depicts a corresponding EDX graph of the 325 mesh particles in FIG. 4A. In FIG. 4A, the area shown in the box 602 corresponds to spectrum 1 in FIG. 4B and Table 1, and the area shown in box 604 corresponds to spectrum 2 in FIG. 4B and Table 1.

Figures 5A, 5B:
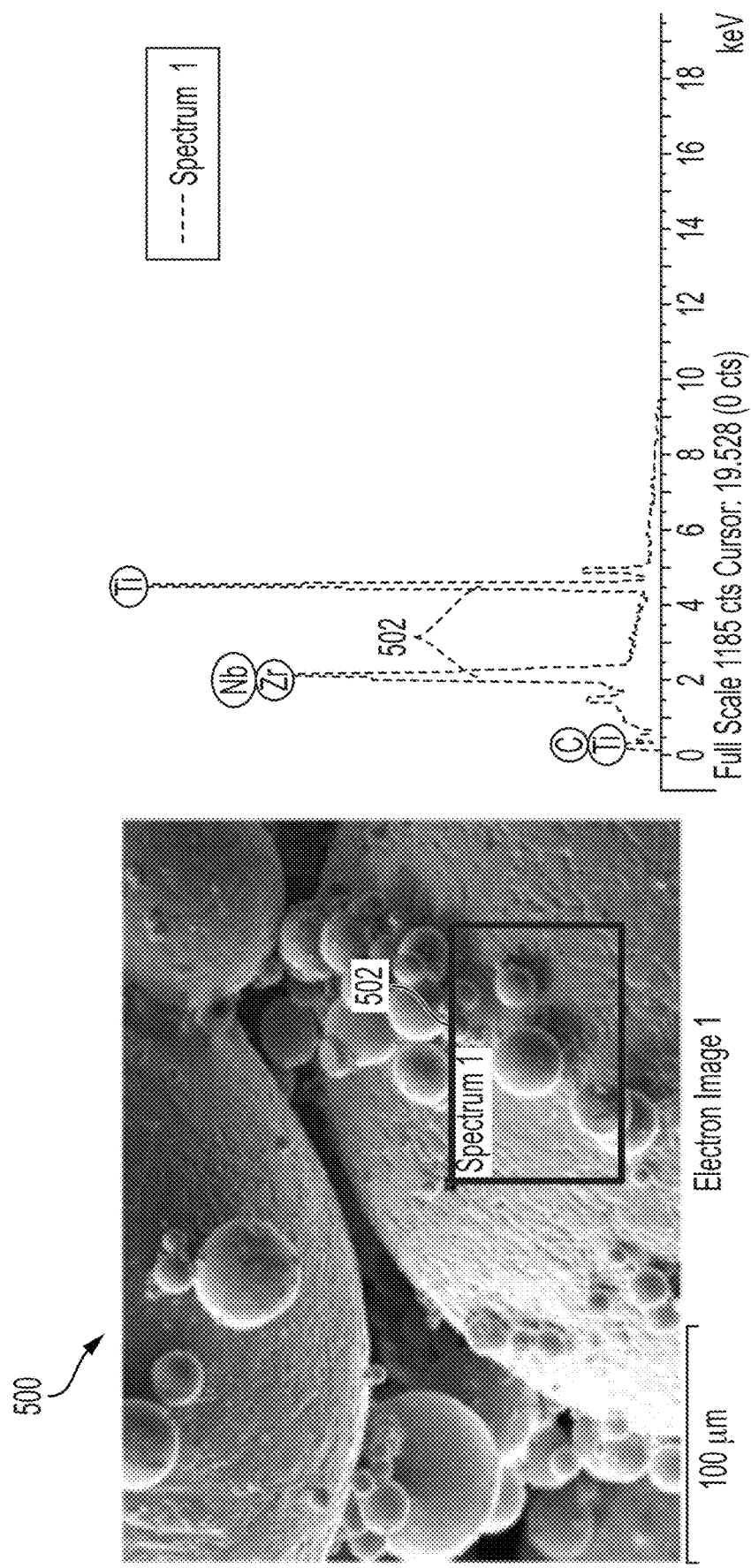
FIG. 5A depicts an electron micrograph of 50 mesh particles of titanium-zirconium-niobium alloy according to embodiments of the present disclosure.
FIG. 5B depicts an EDX graph of the 50 mesh particles of the titanium-zirconium-niobium alloy in FIG. 5A.

FIG. 5A depicts an electron micrograph image (400× magnification) of 50 mesh particles, and FIG. 5B depicts a corresponding EDX graph of the 325 mesh particles in FIG. 5A. In FIG. 5A, the area shown in the box 502 corresponds to spectrum 1 in FIG. 5B and Table 2. Tables 1 and 2 show the elemental analysis determined by EDX (325 mesh in Table 1 and 50 mesh in Table 2).

It is important to note from the foregoing SEM/EDX data that the particles exhibit no evidence of dendritic segregation. Further, these data showed the uniformity in chemistry of widely differing particle sizes of the titanium-niobium-zirconium alloy, which was directly attributable to the congruently melting nature of the alloy. Without a solid/liquid two phase region during melting for atomization, there was no segregation of alloying elements. Such uniformity in chemistry and microstructure with clean surfaces makes this alloy uniquely suited as a matrix material for blended composition tailored additive manufactured composites.

TABLE 1

Elemental analysis of 325 mesh alloy particles

| Spectrum | C (wt. %) | Ti (wt. %) | Zr (wt. %) | Nb (wt. %) | Total (wt. %) |
| --- | --- | --- | --- | --- | --- |
| 1 | 1.68 | 65.72 | 14.24 | 18.35 | 100.00 |
| 2 |  | 71.06 | 13.24 | 15.71 | 100.00 |

TABLE 2

Elemental analysis of 50 mesh alloy particles

| Spectrum | C (wt. %) | Ti (wt. %) | Zr (wt. %) | Nb (wt. %) | Total (wt. %) |
|---|---|---|---|---|---|
| 1 | 2.67 | 64.91 | 14.80 | 17.63 | 100.00 |

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, in some embodiments, "about" can include a range of ±10%, 9%, 8%, 7%, 6%, 5%, 4%, 3%, 2%, or 1% of a given value.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. An optical mount part comprising:
a body formed partially of a composite alloy, wherein the composite alloy comprises:
about 13.5 to about 14.5 wt. % zirconium;
about 18 to about 19 wt. % niobium; and
titanium, wherein titanium makes up a majority of the composite alloy;
wherein the composite alloy has a congruent melting temperature of about 1750 to about 1800° Celsius (° C.);
wherein the body also includes a second metallic alloy and the body includes a gradient of the composite alloy and the second metallic alloy along the body.

2. The optical mount part of claim 1, wherein the second metallic alloy is: an iron alloy, a nickel alloy, a nickel-iron alloy, an iron-carbon alloy, an aluminum alloy, a copper alloy, a cobalt alloy, or any combination thereof.

3. The optical mount part of claim 1, wherein the body further includes boron nanoparticles, boron nitride nanoparticulates, boron nitride nanotubes (BNNTs), or a combination thereof.

4. The optical mount part of claim 1, wherein the body further includes a nanocomposite, a conductive metal, or a combination thereof.

* * * * *